Nov. 1, 1966

A. J. STANTON

3,282,177

ELECTROPHOTOGRAPHIC APPARATUS

Filed Feb. 24, 1964

INVENTOR.
ARTHUR J. STANTON
BY
Marechal, Biebel, French & Bugg
ATTORNEYS

Nov. 1, 1966   A. J. STANTON   3,282,177
ELECTROPHOTOGRAPHIC APPARATUS
Filed Feb. 24, 1964   8 Sheets-Sheet 7

INVENTOR.
ARTHUR J. STANTON
BY
Marechal, Biebel, French & Bugg
ATTORNEYS

United States Patent Office 3,282,177
Patented Nov. 1, 1966

3,282,177
ELECTROPHOTOGRAPHIC APPARATUS
Arthur J. Stanton, Warrensville Heights, Ohio, assignor to Harris-Intertype Corporation, Cleveland, Ohio, a corporation of Delaware
Filed Feb. 24, 1964, Ser. No. 346,718
9 Claims. (Cl. 95—1.7)

This invention relates to copy reproducing machines, and more particularly to an improved compact apparatus for making a copy of an original on an electrophotographic member.

It is an object of the present invention to provide an improved compact apparatus for the reproduction of an original by an electrophotographic process wherein an image of the original is formed on an electrophotographic member, developed by a liquid developer including marking particles dispersed in an electrically insulating liquid whereby the deposited particles are adhered to the member thus forming the final useable copy thereon.

Another object of the present invention is the provision of an improved electrophotographic apparatus for making prints of an original on a sheet wherein the sheet is advanced along a predetermined path through a charger, an exposing station and a developing station, and wherein the image which is developed on the sheet is sufficiently adhered thereon to allow subsequent handling of the sheet without damage to the developed image.

It is another object of this invention to provide an improved compact electrophotographic apparatus adapted to receive a first sheet which is fed from a horizontal plane and vertically through a charger, an exposing station and then horizontally through a developing station, and which leaves the developer station and travels in a vertical path parallel to the vertical path through the charger and exposing station to a discharge outlet.

A further object of the present invention is an improved electrophotographic apparatus capable of making a copy of any original object which will reflect light and which includes a horizontal image plane and a vertically disposed exposure frame, and wherein an image of the original to be reproduced is projected to a sheet in the exposure frame uniformly exposing the sheet to a light image of the original, and wherein the exposed sheet is developed by a liquid developer and dried to provide a copy of the object which is on the image plane.

A further object of the present invention is to provide an improved exposure station and developing station for use in a compact electrophotographic apparatus wherein the exposure station includes an improved arrangement for transporting a sheet having an electrostatic charge thereon, and wherein the developing station is constructed and arranged to provide optimum developing conditions.

A further object of the present invention is to provide an improved compact electrophotographic apparatus capable of making a copy of any object which will reflect light and which includes a horizontally arranged sheet feed mechanism for feeding sheets to a vertically arranged charger and then to a vertically disposed exposure frame wherein the charged sheet is exposed to a reflected light image of an original arranged in a horizontal plane, the exposed sheet being then advanced along a horizontal path in a first and then second direction to develop the image with a liquid developer, and subsequently advanced through a dryer in a vertical path parallel to the path through the charger and exposure frame to a discharge outlet.

Other objects and advantages of the present invention will be apparent from the following description, the accompanying drawings and the appended claims.

Figure 1:
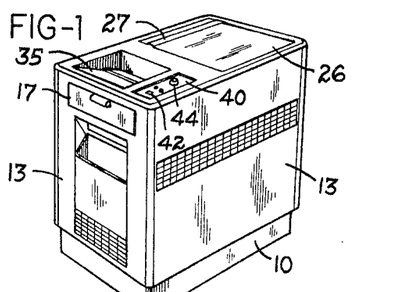
FIG. 1 is a view in perspective showing the exterior portion of the electrophotographic apparatus of this invention.
Figure 2:
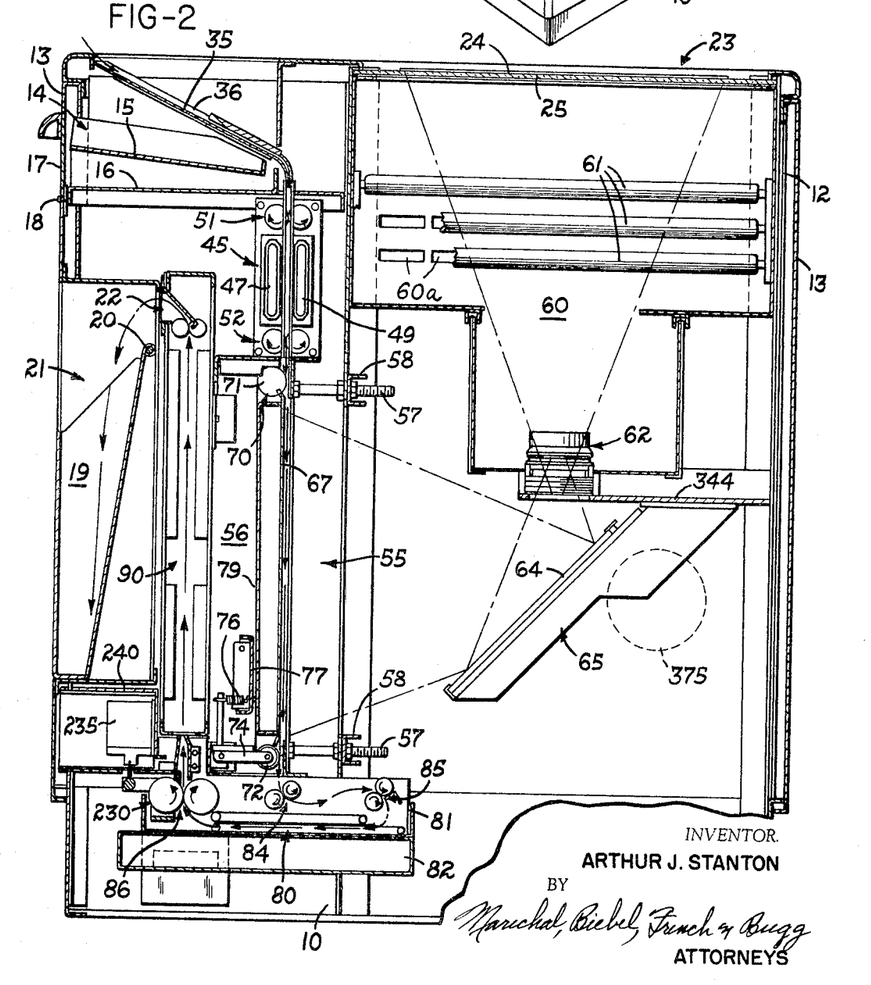
FIG. 2 is a view partly in section and partly in elevation showing the interior working parts of the apparatus of this invention.

Referring to the drawings which illustrate preferred embodiments of the apparatus constructed in accordance with the present invention, FIGS. 1 and 2 show the general arrangement of the electrophotographic apparatus which includes a base frame member 10 and frame members 12 which support covers 13, and doors (not shown), the latter providing access to the interior working parts of the machine. Electrophotographic paper is stored in compartment 14 which is provided on one side of the machine and which includes tray 15 for sheets of 8½ x 11 inches in size, and tray 16 for sheets of 9 x 14 inches in size. Access to the compartment 14 is provided by a door 17 hinged at 18 to the outer cover 13. Located vertically below the paper storage compartment 14 is a delivery chute 19 hinged at 20 in a recessed portion 21 of the outer cover and adapted to receive the final copy which exits through an aperture 22. Electrophotographic paper suitable for use in the machine of this invention is described in copending application Serial No. 640,353, filed February 15, 1957 and assigned to the same assignee as this application.

Figure 1A:
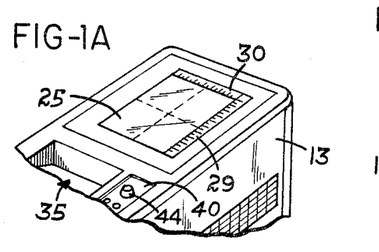
FIG. 1a is a view in perspective with a portion thereof broken away showing the guide arrangement of the copy holder.

On the upper portion of the copy machine is a horizontally disposed assembly generally designated 23 for receiving an original 24 to be reproduced. The original to be copied is placed printed side down in contact with a transparent glass plate 25, which forms an object plane, and is covered with an opaque mat 26 hinged along one side 27 of the top surface of the machine, as shown in FIG. 1. The glass plate 25 which serves as an object plane is provided with guide elements 29 and 30, as shown in FIG. 1a which serve to register adjacent edges of the original with respect to reference edges in an exposure station as will be described below. Above the storage compartment and vertically above the delivery chute 19 is a feed table 35 disposed in a generally horizontal plane and which is sufficiently wide to receive sensitive paper of the dimensions previously described. A sheet is fed into the machine by placing it sensitive side up on the feed table, registering a side edge against a side register guide 36 to align the sheet and advancing it into the machine until it is picked up by the first set of feed rollers, as will be described more fully hereinbelow.

To the right of the feed table 35 (as viewed in FIG. 1) is a control panel 40 including a start and stop buttom 42 for energizing the machine, and a manually operated timer 44 for setting the exposure time as will be described below.

Positioned in the path of sheet travel and vertically below the feed table 35 is a charging station 45 including spaced corona charging units 47 and 49 into which a sheet is fed vertically from the feed table 35 which is arranged in a generally horizontal plane with respect to the path of travel through the charging station. Located vertically below the charging station 45 is an exposure station generally designated 55 which includes an exposure frame 56 suitably mounted by bolts 57, and the like, to channel members 58 of an interior frame. The exposure frame also acts as a supporting element for the charging station which is so connected thereto that the path of advancement through the charging station is in alignment with the part through the exposure frame.

At the exposure station, all portions of the sensitive side of the sheet are unobstructed for exposure to the light reflected from the original 24 which is located laterally and vertically above the exposure frame and supported by the transparent glass plate 25. Supported in a light housing 60 are a plurality of fluorescent bulbs or quartz glass lamps 61 which uniformly illuminate the original, and the reflected rays are focused by a lens system 62 positioned in the lower end of the light housing 60. The lens system 62 includes a shutter mechanism (not shown) whose opening time is controlled by the timer 44. Positioned below the lens assembly 62 is an inclined mirror 64 suitably mounted on a mirror support assembly generally designated 65. Rays focused by the lens assembly 62 are reflected from the mirror 64 to a sheet which is in a predetermined aligned position within the exposure frame 56 thereby exposing the sheet by a one-shot exposure sequence.

The exposure frame 56 includes a fixed perforated plate 67 and a conveyor system 70 within the exposure frame 56 for receiving the sheet as it leaves the charging station 45 and for transporting it through the exposure station. The conveyor system includes two crowned rollers 71 and 72 rotatably mounted, roller 71 being driven, as will be described more fully hereinbelow, while roller 72 is spring biased through a pivotally mounted lever arm 74 having one end of a spring 76 affixed thereto with the other end of the spring attached to mounting bracket 77. Travelling over the rollers 71 and 72 is a belt assembly 79 which passes over plate 67 and which is maintained under proper tension by spring biased roller 72. During assembly the axis of the crowned rollers 72 may be skewed to center the belt assembly 79. A sheet leaving the charging station 45 is picked up by the belt, as will be described in detail below, and carried vertically downward into the exposure station 55. When the sheet is in proper position for exposure, mechanism to be described later stops the belt assembly 79 and the sheet, and automatically actuates the mechanism for projecting the image of the original on the sheet.

Once an electrostatic latent image is formed on the sheet, it is transported vertically downward into a developing station 80 where the sheet is treated with a suitable liquid developer, preferably of the type described in co-pending application Serial No. 115,643 filed on June 8, 1961, now Patent No. 3,241,957, and assigned to the same assignee as this application.

The developer station 80 includes a developer tank 81 and developer sump 82 supported beneath the exposure station 50 by base frame elements 10. Rotatably supported by the side members of the developer unit is a first set of rollers 84 so arranged that a sheet leaving the exposure frame enters the nip of rollers 84 with the sensitive side facing the object plane and is advanced in a predetermined path which is horizontally in a first direction to a second set of rollers 85. From the second set of rollers 85, the sheet is turned with the sensitive face away from the object plane and is advanced horizontally in a second direction beneath the level of liquid developer, and the latent image thereon is developed. The sheet is then guided to a third set of rollers 86 which operate to remove the residual liquid vehicle and advance the sheet in a generally vertical plane spaced from the path of travel through the exposure frame and into a drying station 90 which completes removal of the liquid and brings about substantially permanent adhesion of the developed image, as described in the said copending application Serial No. 115,643. From the drying station 90 the sheet is advanced through the aperture 22 provided in the front cover and the finished, dry copy drops into the delivery chute 19.

Figure 3:
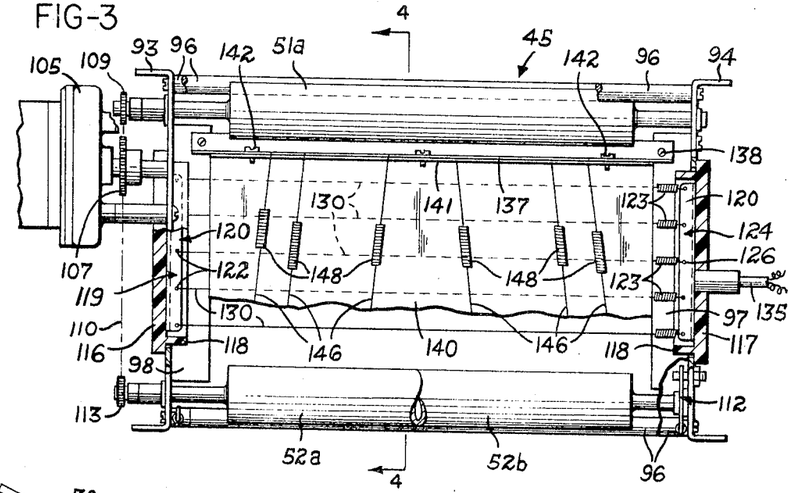
FIG. 3 is a view partly in section and partly in elevation of the charging assembly.
Figure 4:
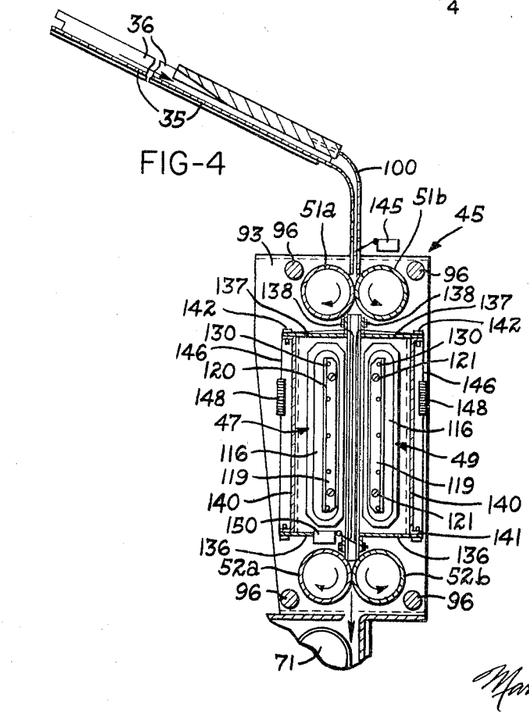
FIG. 4 is a view in section generally along the line 4—4 of FIG. 3.

The charging station, the details of which are shown in FIGS. 3 and 4, includes end plates 93 and 94 secured together by a plurality of rods 96. Between the feed table 35 and the charging station is a curved deflector guide assembly 100 which effects vertical alignment of the sheet with the first set of drive rolls 51. Each of the rolls 51a and 51b of the first set of rolls is rotatably mounted in the side frames 93 and 94 by bearing assemblies, and roll 51b is preferably covered with a resilient insulating material.

Mounted on end plate 93 is a small electrical brake motor 105 including a chain sprocket 107 thereon. On the shaft of roll 51a is a chain sprocket 109, and a driving connection is made between sprocket 107 and 109 by an endless chain 110 to cause roll 51a to turn in a clockwise direction as viewed in FIG. 4 thereby carrying a sheet vertically downward through the charging station. Driving relationship between rolls 51a and 51b is accomplished by providing a spring biased pivotal lever (not shown) attached to the shaft of roll 51b which urges it against roll 51a, and as a sheet passes into the nip between rolls 51a and b, it is picked up and driven through the charging station.

Figures 5, 6:
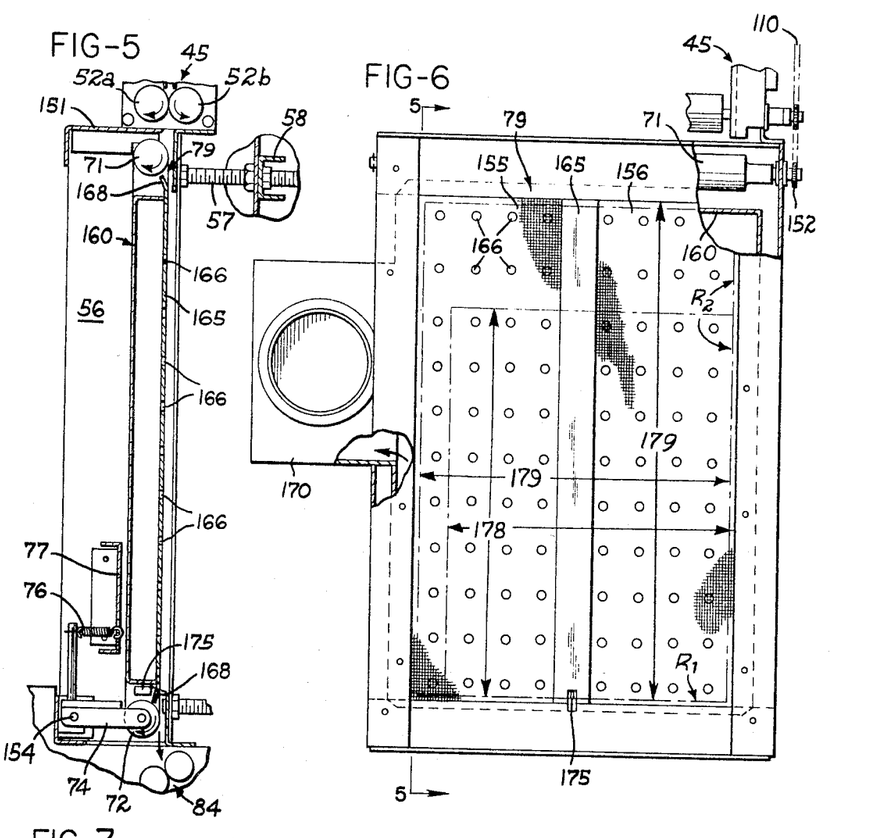
FIG. 5 is a view partly in section and partly in elevation along the line 5—5 of FIG. 6 of the exposure frame and supporting assembly therefor.
FIG. 6 is a view as seen from the right of FIG. 5, with portions thereof broken away, of the exposure frame.

The second set of rolls 52 in the charging station includes a driven roll 52a and a roll 52b, each being rotatably supported in the side frames, and roll 52b being biased against roll 52a by a spring biased pivotal lever arrangement 112 as shown in FIG. 3. To the shaft of roll 52a there is affixed a sprocket wheel 113 which receives the chain 110 driven by the sprocket 107, thereby driving rolls 51a and 52a at substantially the same peripheral speed for moving the sheet between the first and second set of rolls of the charging station at a predetermined fixed speed. The chain 110 also establishes a driving connection between the roll 71 of the exposure frame as shown in FIG. 6.

Disposed on each side of the path of travel through the charger and between the first and second set of rolls of the charging station are two spaced corona generating units designated 47 and 49. Each unit includes a pair of electrically insulating mounting blocks 116 and 117 affixed to the end plates 93 and 94 respectively. Each block includes flanges 118, while mounted on each of the blocks 116 is a conductive supporting frame 119 for corona wires 130 and which is affixed to the respective block by a plurality of screws 121. Supporting frames 119 include an inwardly extending edge 120 provided with a plurality of apertures 122 which hold the ends of the corona wires 130. The corresponding supporting frame 124 on each of the mounting blocks 117 also includes a plurality of apertures 126 which receive springs 123. The corona wires 130 are attached to the corresponding supporting frame 119 and springs 123 so that the plurality of fine corona generating wires 130 are strung across the path of sheet advancement in parallel relationship and in a generally perpendicular plane with respect to the path of travel. Suitable corona generating potentials are applied to the conductive supporting frame 124 of each unit 47 and 49 by electrical leads 135, and with electrophotographic paper of the type described in said application Serial No. 640,353 a negative potential is applied to corona unit 49 and a positive potential is applied to corona unit 47 to deposit a substantially uniform charge on the surfaces of the sheet. The positive corona wires are so mounted and held as to prevent virbration thereof. Enclosing each of the corona generating units 47 and 49 is a metallic housing maintained at ground potential and including end plates 136 and 137 secured to the end plate flanges 97 and 98 by screws 138. Between each set of end plates 136 and 137 there is mounted a cover plate 140 which includes a pair of flanges 141 for attachment to the end plates by screws 142.

As a sheet moves down the feed table, lateral alignment and squaring of the sheet is accomplished by using the side register guide 36. Curve deflector 100 directs the sheet into the nip between rollers 51a and 51b. The sensitive surface of the sheet will be facing corona charging unit 49 and a negative charge will be applied thereto. As the sheet enters the charging station, a switch 145 mounted in the path of sheet travel is tripped to energize the corona generating units, and the sheet passes between the units 47 and 49 which are mounted on each side of the end plate flanges to charge the sheet as described. A plurality of nylon threads 146 are looped around each of the corona generating units and maintained in tension by springs 148 to guide the sheet through the units and prevent its travel into the space between the corona generating wires 130 and plate 140 of the corona housing. As the trailing edge of the sheet leaves the charging station, a second switch 150 mounted in the pathof travel between the second set of rolls 52 and end plates 136 is actuated to turn off the corona generating units. In this way, the corona units are energized only when a sheet is present in the charger.

The sets of drive rolls 51 and 52 are spaced apart a distance sufficient to accommodate sheets of varying sizes, the minimum size of the sheet corresponding to the distance between the nips of the respective sets of drive rolls. Additionally, each roll of each set is of a length sufficient to accommodate sheets of about nine inches in width while the two sets of corona wires are similarly dimensioned to accommodate sheets of that size. It is within the scope of this invention to vary the above dimensions in order to accommodate smaller sheets or sheets of greater width.

Figure 7:
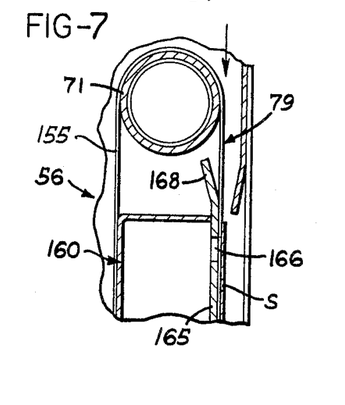
FIG. 7 is an enlarged fragmentary view of the infeed section of the exposure frame.

Supported by the frame element 58 as shown in FIGS. 5–7 is the exposure station 56 which includes a metallic case 151 which also acts as a support element for the charging station 45. Rotatably supported by the metallic case 151 is the roll 71 which includes sprocket 152 on the shaft thereof and connected in driving relation to chain 110. Roll 72 at the lower end of the exposure frame is spring biased by the lever 74 and spring 76 so that the lever tends to urge the roller in a clockwise arc about pivot point 154. Passing over rollers 71 and 72 is the belt assembly 79 including a pair of endless belts 155 and 156 which are laterally spaced apart a small distance as shown in FIG. 7.

The belts are preferably formed of open mesh, material such as fiberglass screen mesh or other flexible perforate material and proper tension is maintained on the belts by roller 72. Positioned between the runs of the belts 155 and 156 is a vacuum frame 160 including a front plate 165 which includes multiple perforations 166 in the area thereof coextensive with the vertically travelling mesh belts. It is preferred that plate 165 extend somewhat beyond the vacuum frame body and accordingly, bent lip segments 168 are provided. Secured to the vacuum frame 160 is a manifold assembly 170 which is connected to the intake side of ab lower assembly to be described later so that air is pulled through the apertures of the perforated belts 155 and 156, through the apertures 166 of plate 165 into the vacuum frame 160 and from the manifold 170 to the intake side of the blower.

As the leading edge of the sheet leaves the nip of the second set of drive rolls 52, it enters the exposure case 151 and is advanced further into the exposure frame by the drive rolls 52. The vacuum created in the vacuum frame holds the paper against belts 155 and 156, with the charged sensitive surface of the sheet facing mirror 64. Since it is desirable to have the entire light sensitive surface of the sheet entirely exposed to the lens system, the endless belt assembly of the present invention operates satisfactory to this end.

The sheet is properly aligned within the exposure frame when the leading edge thereof contacts a small magnetic reed switch 175 positioned in the path of sheet travel and preferably extending out of the lower end of the vacuum frame. Once this switch is tripped by the leading edge, the motor 105 is deenergized by an appropriate circuit to be described more fully hereinbelow, and the rotation of rolls 51a, 52a, 71 and 72 stops abruptly by the action of the brake on the motor. At the same time, a shutter assembly to be described is energized and the properly aligned sheet is exposed for a predetermined period of time as controlled by the setting of timer 44. Subsequent to exposure, the motor 105 is again energized and rolls 51a, 52 and 71 are driven to advance the exposed sheet into the developing station 80 as previously described. The drive rolls of the charger are stopped during exposure of a sheet in the exposure frame in order to prevent in-feed of a second sheet until the first sheet starts to leave the exposure frame and thus provides a small delay between in-feed of successive sheets.

The dimensions and arrangement of the exposure frame are such that if the original is placed on the copy holder in a predetermined position relative to reference guides 29 and 30, the image of the original will be properly aligned with respect to the exposure frame. Referring particularly to FIG. 6, each sensitive sheet, regardless of size, contacts switch 175 which operates to shut off the drive motor as previously described so that the leading or reference edge of each sheet $R_1$ always stops at the same point in the exposure frame. Likewise reference side edge $R_2$ of the sheet which was registered against side register guide 36 on the feed table will always be in the same relative position in the exposure frame. Thus 8½ x 11 sheets will be in a position indicated at 178 while sheets 9 x 14 in size would be in a position indicated at 179 so that each could receive an image wherein the image is properly oriented with respect to the leading edge of the sheet. Assuming that an original of 4 x 5 inches were placed against the guides 29 and 30, the image is projected so that its reference edges coincide with the reference edges $R_1$ and $R_2$ of the exposure frame, that is, the lower right quadrant as viewed in FIG. 6. Using the reference edges 39 and 30 as guides, the position of the projected image may be oriented relative to reference edges $R_1$ and $R_2$, which also represent the leading and side edges of the sensitive sheet, merely by shifting the position of the original with respect to guides 29 and 30.

The sheet S leaves the exposure frame and enters the developing station 80 which is positioned vertically below the exposure frame. The developing station, the details of which are shown in FIGS. 8-11, include a tank 81 with side members 191 and 192 and a developer sump assembly 82. Rotatably supported by bearings mounted in the side frames is a first set of rolls 84 including roll 84a which is driven and roll 84b, the latter being urged into driving contact with the former by lever arm assemblies 193 and 194 which are pivoted in the side frames 191 and 192. The sheet leaving the exposure frame enters the nip between rolls 84a and 84b with the aid of guide 197, and is advanced to the second set of rolls 85 which are horizontally spaced from rolls 84. The rolls of the first set are preferably arranged within the developer tank so that the plane of the axes of the rolls is at an acute angle with respect to the plane of sheet travel as it leaves the rolls. This helps deflect the sheet from a vertical to a horizontal position. Supported by the side frames of the developer is a sheet guide 196 which cooperates with guide plate 199 to feed the leading edge of the sheet into the nip of the second set of rolls 85. As the leading edge of the sheet leaves the nip of rolls 84, the back surface thereof contacts sheet guide 196 and the sheet moves toward rolls 85. Any tendency of the sheet to pass over the second set of rolls 85 is eliminated by guide plate 199.

The second set of rolls includes roll 85a which is driven and roll 85b which is biased into driving contact with roll 85a by spring and lever assembly 201, which is similar in function and structure to assembly 193. The plane of the axes of the rolls is at an oblique angle with respect to the plane of sheet travel for picking up the leading edge of the sheet and advancing it downwardly.

Disposed below roll 85a is a driven roll 205 formed of a plurality of segments and supported for rotation by bearings mounted in side frame 191 and 192. Between the segmented portions of roll 205 are a plurality of sheet guide elements 207 mounted on a support element 208 which is supported by slotted brackets 209 affixed to the side frame. Sheet guide elements 207 cooperate with rolls 85a and 205 to curve the sheet vertically downwardly from a horizontal plane into the developer dispersion.

Figure 8:
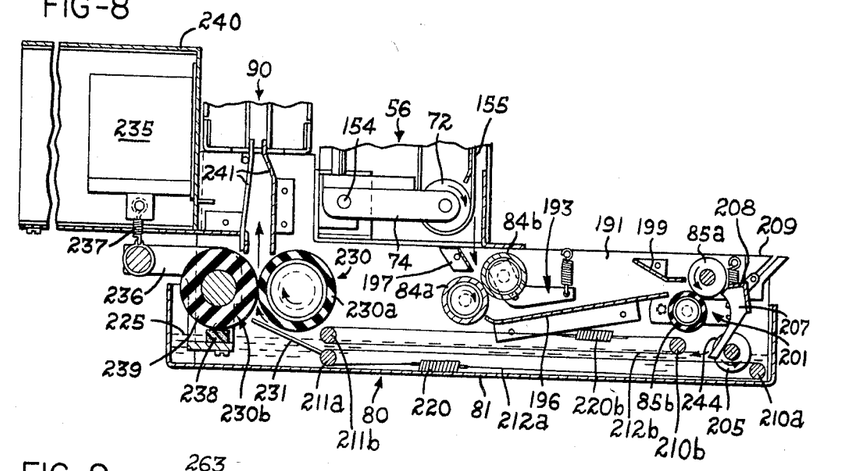
FIG. 8 is a view partly in section and partly in elevation of the developer unit taken along the line 8—8 of FIG. 10.

Journaled into the side frames are a plurality of guideway support rods 210, 210a, 210b and 211, 211a and 211b which have a plurality of nylon threads 212, 212a and 212b looped thereover and maintained under tension by springs 220. These guide rods and associated thread elements provide a guideway for the sheet as it passes into the liquid developer which is generally maintained at a level 225 as shown in FIG. 8.

The paper leaving the developer dispersion is advanced in a horizontal plane to a third set of rolls 230 which are suitably mounted in the side frames by bearings and the like and guided into the nip thereof by guide fingers 231 mounted on rod 211a. Roll 230a is driven while roll 230b is biased thereagainst by a solenoid assembly 235. Affixed to the roll 230b is a linkage assembly 236 which is connected to the solenoid 235 by a spring biased connector assembly 237. In the energized position, roll 230b is urged into contact with roll 230a by the solenoid.

The rolls 230 act as a squeegee to remove a substantial amount of the liquid which adheres to the surface of the developed sheet without blurring the developed image or splitting away any significant amount of the deposited developer material. In a preferred form, a scrubber 238 contacts the roller 230b along the length thereof, and the outer core 239 of the roller 230b is of the soft natural or synthetic rubber which is stable in hydrocarbon vehicles. The theory and operation of the squeegee roller system is identified and explained in more detail in copending application Serial No. 115,643, filed on June 8, 1961, and assigned to the same assignee.

The solenoid assembly 235 is mounted in a solenoid housing 240 which is affixed to the side frames 191 and 192. The paper leaving the squeegee roll unit 230 is guided through guideways 241 into the dryer unit 90 which is positioned vertically above the developer unit and in spaced parallel relationship to the exposure frame.

In a preferred form, the second set of rolls 85 may be driven at a linear velocity less than the linear velocity of rolls 84 resulting in the formation of a buckle in the sheet while on sheet guide 196 and while between rolls 84 and 85. In this way, the linear velocity of the sheet through the developer is less than the velocity of the sheet through any preceding components of the machine thereby providing a greater transit time through the developer station for providing good quality development of the electrostatic latent image. This relatively long transit time in the developer unit in comparison to the transit time through the other portions of the machine is possible because of the small delay between the infeed of successive sheets through the exposure frame, and thus the delay may be used to advance in the developer system.

Since the sheet has an electrostatic latent image thereon, care is taken to avoid contact between the surface bearing the latent image and any stationary surface. To this end, rolls 84a and 85a are driven as is roll 205. The guides 207 between roll 85a and 205 are contacted only the leading edge of the sheet since the surface of the roll 205 projects beyond the guideway as shown at 244. The leading edge of the sheet rides over the projecting portion 244 of roller 205 at the point at which the surface of the sheet would contact the stationary guides, and thus the surface bearing the image contacts a moving surface and there is little if any drag between the image bearing surface and the surface of the drive and guide members.

Figure 9:
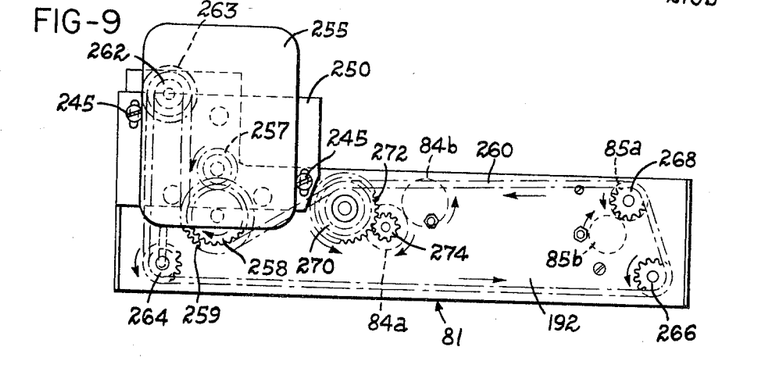
FIG. 9 is a view as seen from the right of FIG. 10 showing the drive assembly for the developer unit.
Figure 10:
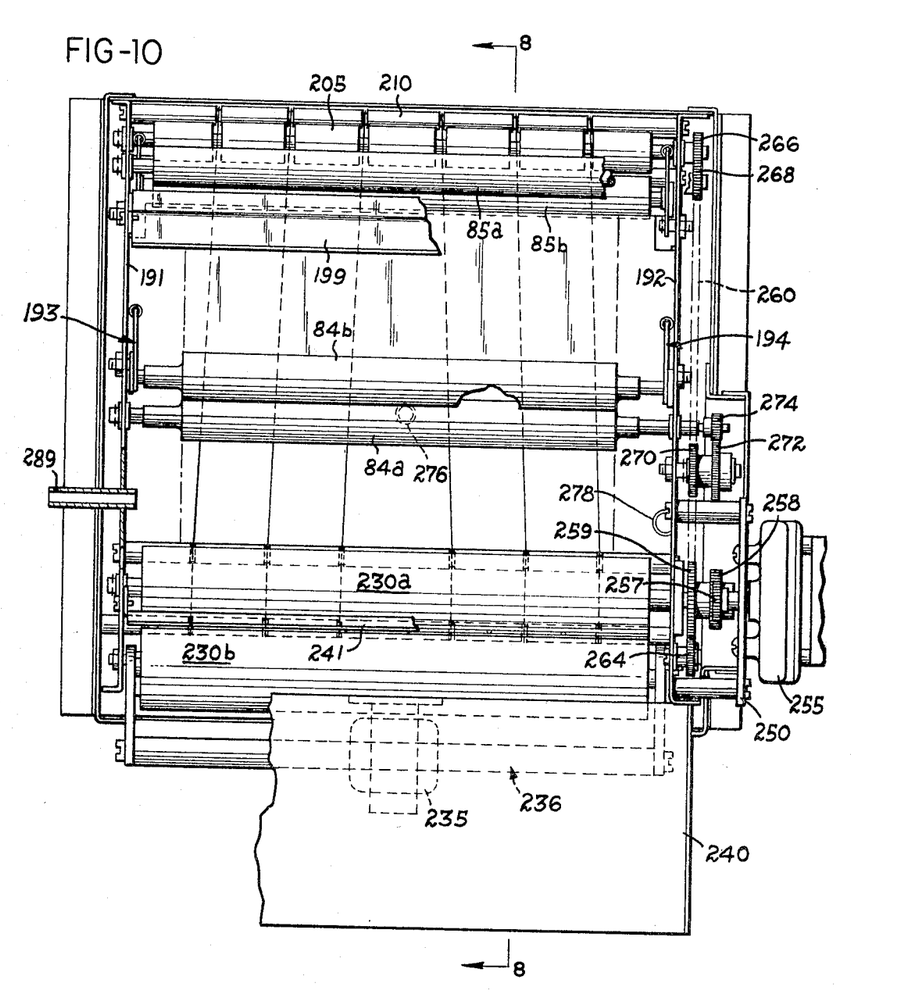
FIG. 10 is a plan view of the developer unit and developer tray.

The driving means for the various rolls may be understood with reference to FIGS. 9 and 10. Mounted on the side frame 192 by bolts and spacing collars 245 is a motor mounting bracket 250 to which is affixed the small electrical motor 255 including a drive gear 257 which drives gear 258 fixed to roll 230a. Also fixed on roll 230a is drive sprocket 259 which drives an endless drive chain 260. The chain passes under sprocket 259 and over idler sprocket 262 which includes gear 263 which operates to drive the drive assembly in the dryer unit 90. The chain 260 then passes over chain tension sprocket 264 and from there travels around sprockets 266 and 268 which drive rolls 205 and 85a, respectively. Supported by side frame 192 is an idler sprocket 270 which receives the chain, and which includes a gear 272 which meshes with gear 274 of roll 84a.

Figure 11:
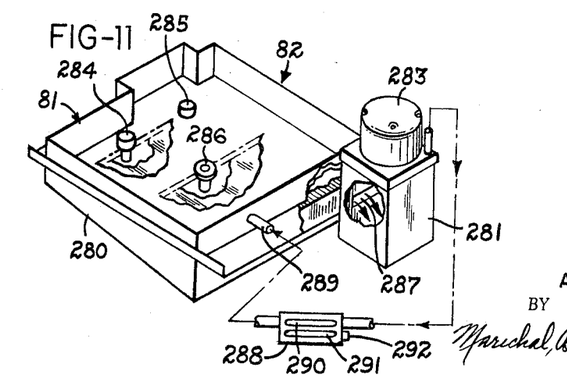
FIG. 11 is a view in perspective of the developer tray and storage tank assembly.

Referring to FIG. 11 the developer tray and storage tank assembly 82 includes an upper container 81 which receives the developer assembly described in FIGS. 8-10. Assembly 82 also includes a developer storage tank 280, a sump compartment 281, a pump 283, overflow tubes 284 and 285, and a small drain port 286, the latter of which serves as a means of draining the developer from the upper tank 81 into the storage tank when the machine is turned off. The overflow tubes serve to maintain a fixed level of liquid developer in the upper tank. When the machine is turned on initially, pump 283 is energized. Liquid developer which can flow from the storage tank to the sump through opening 287 is pumped from the sump through a concentration control indicator 288 into the inlet 289 mounted on tank 81. When the liquid level reaches the top of the drain tubes 284 and 285, any additional volume of liquid pumped in overflows the tubes and drains back into the storage tank. This recirculation of liquid developer continues as long as the machine is on.

The concentration control indicator 288 includes sight glass chambers 290 and 291, the former allowing observation of the optical opacity of the developer being pumped and the latter receiving a control sample 292 which indicates the proper optical opacity of the liquid developer for optimum development. It is within the scope of this invention to provide a photocell control unit for matching the optical opacity of the developer liquid with the control sample and automatically adding toner concentrate or carrier liquid as required.

From the developing station, the developed sheet with a small amount of liquid adhering thereto is advanced vertically upward into the drying station by the squeegee and drive roll assembly 230. The drying assembly, the details of which are shown in FIGS. 12–15, includes a housing 293 vertically supported by the exposure frame and is spaced parallel relationship to the exposure frame so that the sheet moves vertically downward through the exposure frame and is advanced horizontally in a first direction through the development station then in a second horizontal direction through the liquid and then vertically up through the drying station 90 in a plane parallel to that of the exposure frame but in a direction which is opposite to the direction of travel therein.

Figures 12, 13, 14, 15:
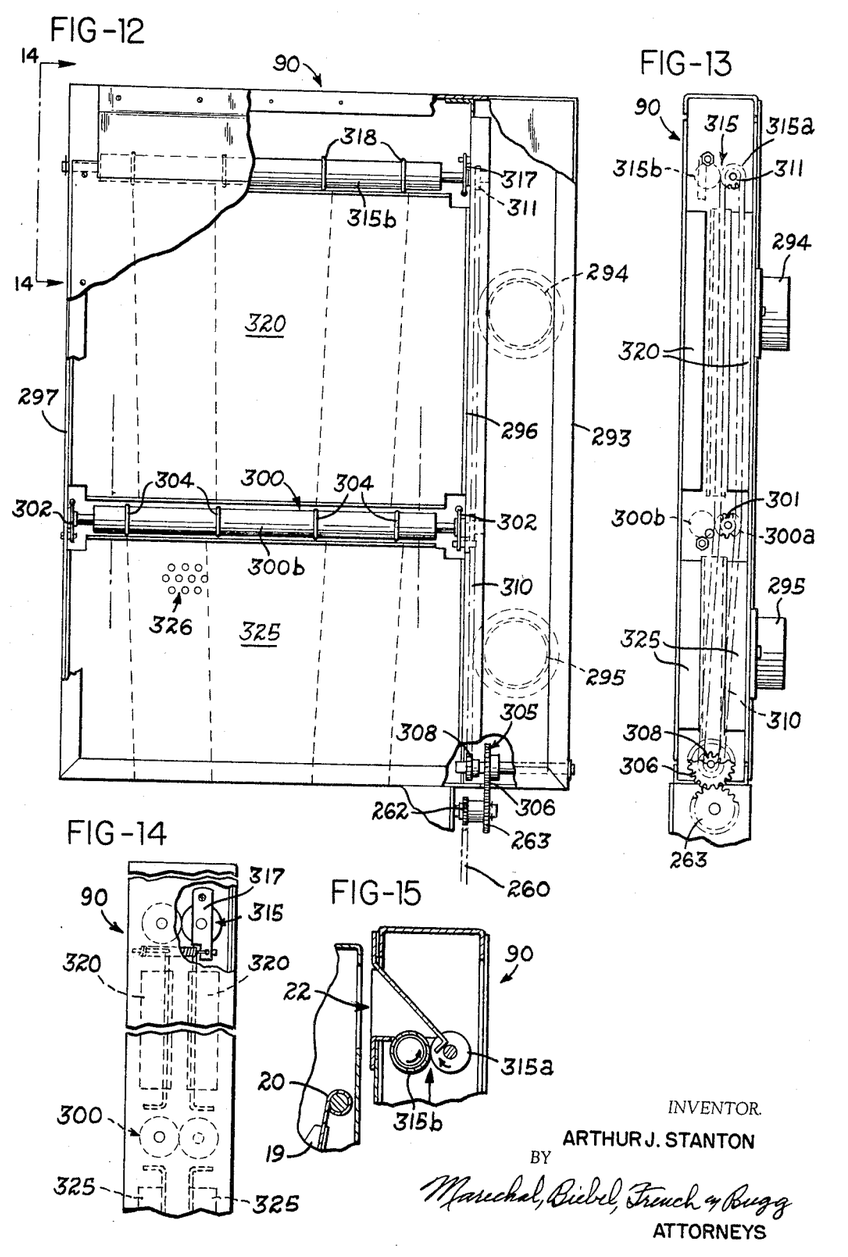
FIG. 12 is a view of the dryer assembly as seen from the left of FIG. 2, with portions thereof broken away.
FIG. 13 is an end view of the dryer assembly of FIG. 12 as seen from the right side thereof.
FIG. 14 is an end view of the dryer assembly showing the roll mounting assembly thereof.
FIG. 15 is an enlarged end view of the discharge exit and delivery chute.

The dryer housing 293 has affixed thereto manifold assemblies 294 and 295 for circulation of heated air and the housing 293 includes side plates 296 and 297 which act as supporting elements for the several drive rolls spaced along the path of sheet travel in the drying station. The first set of rolls of the drying station to pick up the sheet includes rolls 300, one of which 300a includes a sprocket 301 on the shaft thereof. Roll 300b which is biased into engagement with driven roll 300a by lever assemblies 302 includes a plurality of rubber O-rings 304 spaced along the length of the roll and positioned in grooves along the outer periphery thereof.

Mounted for rotation within the side frame 296 is a drive sprocket assembly 305 which includes a gear member 306 driven by gear 263 mounted on the developer unit. The drive sprocket assembly 305 also includes a drive sprocket 308 around which is looped an endless chain 310 which drives sprocket 301 and sprocket 311 to provide a driving connection to a second set of rolls 315 in the drying station. Driving sprocket 311 is mounted on the shaft of roll 315a, with roll 315b being spring biased by lever assemblies 317 into contact with roll 315a. Like roll 300b, roll 315b includes a plurality of spaced O-rings 318 mounted along the length thereof in grooves formed in the outer periphery.

Within the dryer frame are drying compartments 320 and 325 communicating with manifold assemblies 294 and 295. Each of these dryer compartments is perforated as indicated at 326 for passage and circulation of heated air over the printed copy to effect drying thereof and to support the sheet in a vertical plane until it is picked up by the drive rolls. The second set of rolls 315 also act as the final drive rolls to urge the copy through the aperture 22 into the delivery chute 19 as shown in FIG. 15.

Figure 16:
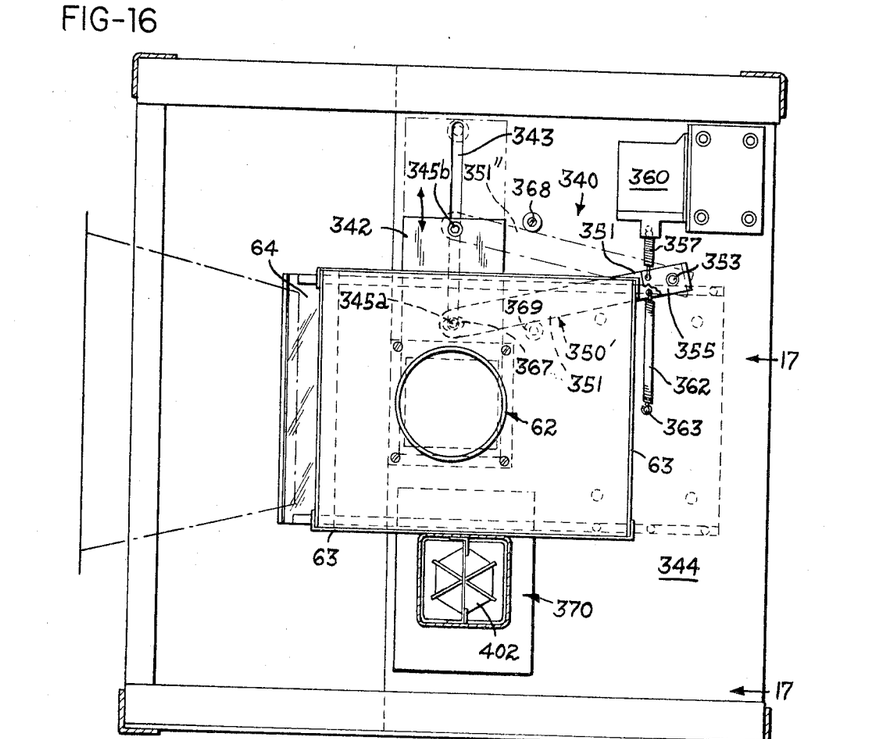
FIG. 16 is a plan view of the shutter mechanism.
Figure 17:
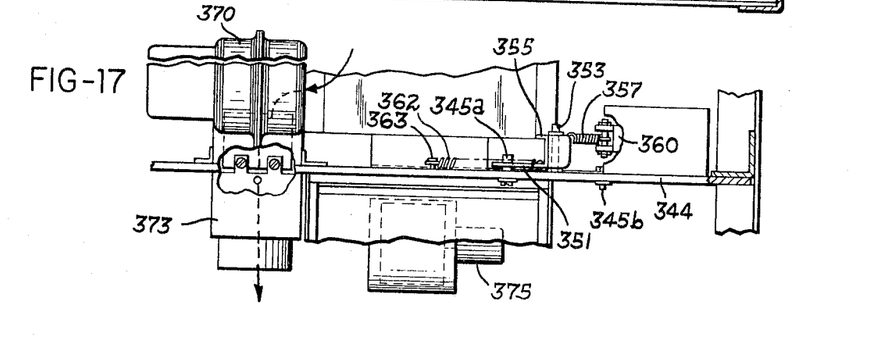
FIG. 17 is an end view of the shutter and lens assembly as seen from the right of FIG. 16.

As was mentioned previously, the timer switch 44 of the control panel 40 operates to control the length of the exposure by controlling the timing of the shuter mechanism 340, the details of which are shown in FIGS. 16 and 17. The shutter mechanism 340 includes a shutter plate 342 which is movable in a slotted guideway 343 provided in a supporting plate 344. Guide pins 345a and 345b are mounted on the shutter plate and extend through the guideway and travel therein. To effect movement of the shutter plate a linkage assembly 350 is provided which includes a pivotal arm 351 affixed at one end thereof to the shutter plate by pin 345a. The arm 351 swings about pivot point 353 which also pivotally secures it to the supporting plate 344.

The linkage assembly 350 includes a second arm 355, which is somewhat shorter in length than arm 351. Affixed to the end of arm 355 is a spring 357, the other end of which is connected to a solenoid assembly 360. Also connected to arm 351 is a weaker return spring 362 the other end of which is attached to spring pin 363 in support plate 344, which also supports the lens assembly 62.

In normal position, arm 351 of the linkage assembly is in the position shown in the dotted outline 351' with the shutter plate 342 covering the lens aperature thus preventing transmission of the image to the mirror and ultimately to the copy sheet. As the leading edge of the sheet trips switch 175 located in the exposure frame, solenoid 360 is energized urging linkage assembly 350 in a clockwise direction as viewed in FIG. 16. As arm 351 rotates, moving the shutter plate and opening the lens aperture, the effective length of the arm changes slightly, and for this reason, the end thereof attached to shutter plate 342 is provided with an oblong slot 367 to compensate for the effective change in length of the arm. As the shutter moves from the position indicated at 351' to the position indicated at 351'', light passes from the lens assembly to the inclined mirror 64 and to the sheet which is held at a stationary predetermined position within the exposure frame. To prevent overtravel of arm 351, a bumper 368 is fastened to support plate 344.

As the timer runs down and reaches the end of its cycle, solenoid 360 is deenergized and spring 362 urges the arm 351 back to position 351' moving the shutter plate with it and covering the lens aperture. Again overtravel of the arm is prevented by bumper 369 also fastened to the support plate 344. The function of spring 357 is to overcome the shock due to the rapid action of the solenoid when closing. Spring 362 is a weaker spring that returns the arm and shutter to position 351'.

Also mounted on the support plate 344 is a fan assembly 370 and heater assembly 373. As the machine is turned on, air is drawn in through openings 60a in light housing 60 and passes over lamps 61 thereby cooling them. This slightly warmed air is diverted over an additional heater 402 and then directed into the drying station 90 through manifolds 294 and 295 to effect drying of the copy. Also mounted on the support plate is a blower assembly 375 with the intake side thereof connected to the manifold assembly 170 of the vacuum chamber in the exposure frame.

Figure 18:
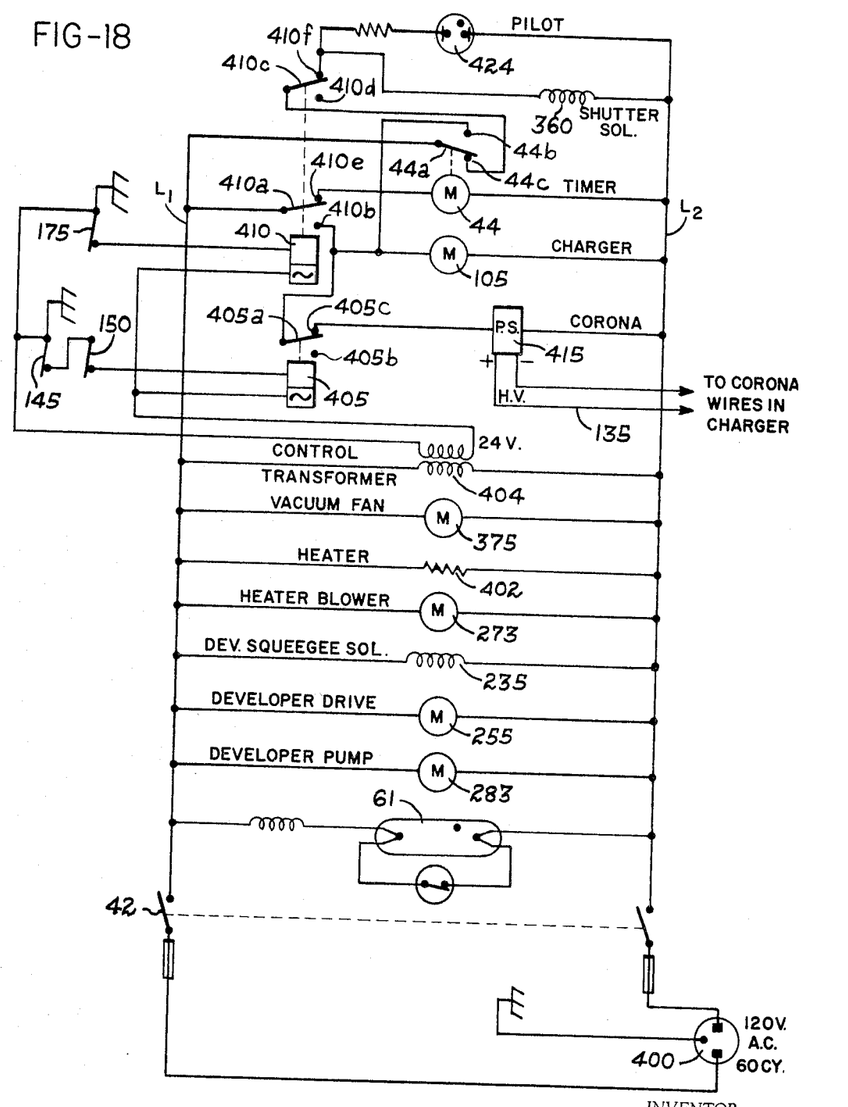
FIG. 18 is a wiring diagram for the various components of the electrophotographic apparatus of this invention.

The electrical controls for operation of the machine may be understood in connection with FIG. 18 wherein the same reference numerals have been employed for the same parts wherever possible. Input power is supplied from a 120 volt A.C. 60 cycle power source 400 and when the machine is energized by depressing switch 42, circuits are completed to the exposure lights 61, the pump 283 of the developer unit, the motor 255 for the developer unit, the solenoid 235 of the squeegee roll, the heater blower 273, the heater 402, and vacuum fan 375. Power is also supplied to a control transformer 404 which steps the voltage down to 24 volts for operation of the several switches as will be now described. With the machine on and no paper in it, switches 145 and 150 of the charger are closed energizing relay coil 405. Switch 175, located in the exposure frame is also closed energizing relay coil 410. With relay coil 405 energized relay arm 405a is in the open position 405b, and the power supply 415 which provides the corona generating potential to leads 135 of the chargers is not yet energized. With relay coil 410 energized, relay arm 410a thereof moves to terminal 410b and 110 volts A.C. is applied to the charger motor 105. At the same time, relay arm 410c moves to the open position 410d and the timer motor 44 and the shutter solenoid 360 are deenergized.

As a sheet of paper moves into the charger, switch 145 is opened deenergizing relay coil 405 which allows relay arm 405a to move to the closed position 405c and 110 volts is supplied from L1 through relay arm 410a and terminal 410b through closed contacts 405a and 405c to power supply 415 with the circuit being completed to L2 and high voltage being applied to corona units from lead wires 135. As the leading edge of the sheet passes through the charger, switch 150 is opened, and since the switches 145 and 150 are in series there is no change in the condition of the circuit. The paper continues to move through the charger with the trailing edge thereof passing switch 145 and allowing it to close, and it is only after the trailing edge thereof passes switch 150 that relay coil 405 is again energized to deenergize corona power supply 415.

At this point during its movement, the leading edge of the sheet will be approaching switch 175. As this switch is opened, relay coil 410 is deenergized and relay arm 410a moves from terminal 410b to 410e energizing the timer motor and deenergizing the charger brake motor thereby preventing a second sheet from entering the unit, and also stopping the travel of belts 156, 159 and the first sheet in the exposure station.

Simultaneously with the deenergization of relay coil 410, contact 410c moves from terminal 410d to 410f thereby energizing the solenoid shutter 360 and exposure pilot light 424 through L1, contact arm 44a and terminal 44c of the timer, contact arm 410c and terminal 410f to L2. At the end of the timer cycle, contact arm 44a moves to terminal 44b and during this break, solenoid 360 is deenergized. As contact is made with terminal 44b, charger motor 105 is energized through L2, arm 44a and terminal 44b and then to L1 resuming movement of the belts and first sheet in the exposure frame. A second sheet may now be introduced into the charger. As the trailing edge of the first sheet passes switch 175 it closes, energizing relay coil 410 which causes contact arm 410a to move to terminal point 410b, to maintain the charger motor energized and switching contact arm 410c to contact 410d to maintain the shutter deenergized. The movement of contact arm 410a to terminal 410b also operates to deenergize and reset the timer 44 thereby allowing contact arm 44a to move to the terminal 44c. As the first sheet moves out of the exposure station it enters the developer station. Once in the developer, progressive movement of the sheet is never interrupted until finally delivered in chute 19.

As the leading edge of the second sheet trips switch 145, the sequence above described is repeated. It will be noted that the circuit operates not only to prevent in-feed of a second sheet while a first sheet is in the exposure frame, but also, the circuit is so coordinated that once switch 175 is tripped, the charger motor stops, maintaining the sheet in the predetermined stationary position within the exposure frame where it is exposed to an image of the original to be reproduced.

It is also possible in accordance with the present invention to utilize a supply of paper which is in the form of a roll whereby sheets of a predetermined length are severed from the roll and fed through the machine as above described. One such modification is described in Patent 3,002,434. An alternate modification for pre-cut sheets includes apparatus for automatically feeding the sheets to the in-feed rolls of the charger. Any conventional sheet feeding unit may be utilized, as is well known in the art. Additionally, it is also possible to provide automatic feeding of any desired number of sheets in the event more than one copy of the same original is to be reproduced. In such instance a counter unit may be so connected to the circuit that once the charger motor is energized the sheet feeding mechanism is also energized.

The improved electrophotographic apparatus of the present invention offers the advantage of providing a compact copy reproducing device capable of providing an accurate reproduction of any object which will reflect light including for example pages in books, drawings, single sheet originals, pictures, and photographs, half-tone, continuous tone or line type originals, and is capable of copying originals written in pencil, ballpoint pen, typewritten, and the like.

This versatility of the the device which is compact and whose power requirements are low because of the absence of a sizable heat fuser is an additional noteworthy advantage. Further, the elimination of transfer operations, by providing a direct image forming and development technique simplifies considerably the structure of the apparatus, and thus the assembly and manufacture as well as the service problems.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. Apparatus for reproducing an original on an electrophotographic sheet comprising feed means to advance a sheet along a generally horizontal path, charger means disposed below said feed means to receive the sheet for depositing an electrostatic charge thereon, said charger means including spaced corona charging units for depositing a charge on each side of the sheet, exposure frame means positioned in sheet receiving relation below said charger means, horizontally disposed object plane means laterally and vertically spaced above said exposure frame means, means defining a light path between said object plane means and said exposure frame means for one-shot exposure of a charged sheet to the reflected light image of an original to be reproduced, developing means positioned in sheet receiving relation below said exposure frame means, said developing means including means to treat a sheet having an electrostatic latent image thereon with a liquid developer, means for drying said sheet disposed in sheet receiving relation with said developer means and in parallel spaced relation with said exposure frame for defining a generally vertical path of travel for the developed sheet in a direction opposite to the path of travel through said exposure frame, discharge means in sheet receiving relation with said dryer means and positioned below said feed means for delivering the dry copy of the original, and means for advancing the sheet from said charger means to and through said discharge means.

2. Apparatus for reproducing an original on an electrophotographic sheet comprising feed means to advance a sheet along a generally horizontal path, charger means disposed below said feed means to receive the sheet for depositing an electrostatic charge on the sensitive surface thereof, said charger means including spaced corona discharge units, means cooperating with said charger units for maintaining them energized only so long as a sheet is in charge receiving relation therewith, exposure frame means positioned in sheet receiving relation below said charger means, object plane means laterally and vertically spaced above said exposure frame means, means defining a light path between said image plane means and said exposure frame means for exposing a charged sheet to an original to be reproduced, means cooperating with said exposing frame for exposing the sheet within th exposure frame to a light image of the original as the sheet reaches a predetermined position, developing means positioned in sheet receiving relation below said exposure frame means, said developing means including means for advancing a sheet with an electrostatic latent image thereon in a first direction and then in a second direction different from said first, said developing means including means to treat a sheet having an electrostatic latent image thereon with a liquid developer, means included in said developing means for removing a substantial amount of the developer carrier liquid from the developed sheet, dryer means disposed in sheet receiving relation with said developing means and in parallel spaced relation with said exposure frame for defining a generally vertical path for the developed sheet, and means for advancing the sheet from said charger means to and through said dryer means.

3. Apparatus for producing multiple copies from a light reflecting original on separate electrophotographic sheets comprising feed means to advance a sheet along a generally horizontal path, charging means including a plurality of corona discharge wires disposed below said feed means to receive the sheet for depositing an electrostatic charge on the sensitive surface thereof, drive means cooperating with said charger means and including spaced driven rolls, exposure frame means positioned in sheet receiving relation vertically below said charger means, said exposure means including stationary vacuum creating means, belt means movable over said vacuum creating means for carrying the charged sheet to a predetermined position within said exposure frame means, object plane means laterally and vertically spaced above said exposure frame means, means defining a light path between said object plane means and said exposure plane means for exposing the sensitive surface of a charged sheet to the reflected light image of an original to be reproduced, shutter means interposed in said light path for permitting passage of the reflected light image of an original to a charged sheet in a predetermined position in said exposure frame, said shutter means including means cooperating therewith for maintaining said shutter open for a predetermined period of time, developer means positioned in sheet receiving relation below said exposure frame means, said developer means including means for advancing a sheet with an electrostatic latent image in a predetermined path which terminates in a generally vertical plane spaced from the path of travel through said exposure frame, said developer means including means to treat a sheet having an electrostatic latent image thereon with a liquid developer, dryer means disposed in sheet receiving relation with said developer means and in parallel spaced relation with said exposure frame for defining a generally vertical discharge path for the developed sheet, switch means cooperating with said charger means and responsive to the leading edge of a sheet to energize said corona discharge wires, said switch means responsive to the trailing edge of the same sheet to deenergize said corona discharge wires, second switch means cooperating with said exposure frame to halt said belt means and the drive means in said charger for positioning a sheet in a predetermined position within said exposure frame and to prevent in-feed of a second sheet until passage of said predetermined period of time, and means responsive to the end of said predetermined period of time to energize said charger drive means and said belt means for allowing in-feed of a second sheet and advancement of the exposed sheet to said developer means.

4. Apparatus for reproducing an image on a sheet having an electrophotographic surface comprising means for advancing a sheet along a generally vertical path of travel at a predetermined rate, a first station along said path including means for charging the surface of a sheet, a second station along said path and below said first station including means to position a sheet in a vertical plane during exposure thereof, means to expose said sheet to an original to be reproduced, developing means forming a third station in said path vertically below said second station for treating the sheet with a liquid developer including marking particles in a liquid carrier to render visible the latent image on the sheet, said developing means including means adapted to receive a liquid developer, means for conveying the sheet through the liquid developer, said third station including squeegee means for removing a portion of the liquid vehicle adhering to the surface of said sheet, a fourth station receiving said developed sheet from said third station, said fourth station being in spaced parallel relation to said second station and including drive rolls spaced a predetermined distance from said squeegee means, said predetermined distance being slightly less than the length of the sheet whereby said squeegee means advances a sheet into said fourth station wherein the leading edge of the sheet is picked up by said drive rolls as the trailing edge leaves said squeegee means, and means for introducing air in said fourth station to support the vertically travelling sheet during advancement through the fourth station while affecting evaporation of residual liquid carrier.

5. Apparatus for reproducing an original on an electrophotographic sheet comprising, in combination, means defining a path of sheet travel a portion of which is generally vertically downward, a horizontally disposed transparent copy holder for receiving an original to be reproduced, a vertically disposed exposure station positioned along the path of sheet travel below and to one side of said copy holder and being generally at a right angle thereto, projection means including an optical system for projecting an image of the original onto one surface of a sheet located in said exposure station, charger means disposed along the path of travel for charging at least that surface of the sheet onto which said image is to be projected prior to advancement thereof to said exposure station, means to advance a sheet through said charger means, means for conveying a sheet from said charger means through said exposure station, said last named means including driven belt means contacting the side of said sheet remote from the side on which said image is to be projected, and means creating a presure differential for holding said sheet against said belt means whereby a sheet may be held in a flat plane during exposure thereof.

6. An apparatus as set forth in claim 5 including means for sensing a portion of a sheet on said belts, and said sensing means cooperating with said conveying means for actuating said projection means for exposing the sheet in the exposure station to an image of the original.

7. An apparatus as set forth in claim 6 wherein said sensing means cooperates with said conveying means to stop travel of said belt means and the sheet thereon during exposure of the sheet to an image of the original.

8. Apparatus for producing a copy of an original on an electrophotographic sheet comprising, in combination, a horizontally disposed transparent copy holder for receiving an original, means on said copy holder for side and front alignment of two adjacent edges of the original thereon, a vertically disposed planar exposure station located below and to one side of said copy holder and being substantially at right angles thereto, side guide means corresponding to said side aligning means on said copy holder for preliminarily aligning a sheet prior to presentation to said exposure station, means for presenting an electrostatically-charged sheet to said exposure station including a vacuum box having a planar perforate surface facing said exposure station and a continuous perforate belt means having a run thereof against the perforate surface of said box, means creating vacuum in said box, electrically-operated drive means for said belt, detector switch means in the path of said sheet during movement of the sheet into the exposure station and located so as to correspond generally to the front aligning means on said copy holder, said switch means being operably connected to said drive means to stop movement of said belt means upon passage of the leading edge of the sheet thereby so that said sheet is presented at rest in a position of front alignment with the front alignment means on said copy holder, means including a reflecting mirror, a lens system and a light source between the transparent copy holder and the exposure station for exposing the electrostatically-charged surface of the sheet in said station to the original on said copy holder to discharge selected areas of the surface in accordance with the light and dark areas of said copy, and means operable to start said belt drive means while said switch means is still engaged by the sheet to deliver the exposed sheet from said exposure station for development thereof.

9. Apparatus as set forth in claim 8 wherein said belt is driven in a direction to move said sheet downwardly after exposure, and further including a liquid developing station below said exposure station, and dryer means for receiving developed sheets and moving them upwardly in a path parallel to and closely adjacent said vacuum box and then outwardly away from said box.

References Cited by the Examiner

UNITED STATES PATENTS

| | | | |
|---|---|---|---|
| 2,950,661 | 8/1960 | Limberger | 95—1.7 |
| 2,984,163 | 5/1961 | Giaimo | 95—1.7 |
| 3,002,434 | 10/1961 | Reuter | 95—1.7 |
| 3,079,839 | 3/1963 | Lohner | 95—76 X |
| 3,088,386 | 5/1963 | Sugarman | 95—1.7 |
| 3,124,484 | 3/1964 | Magnusson | 95—1.7 |
| 3,164,074 | 1/1965 | Francis et al. | 95—1.7 |
| 3,180,239 | 4/1965 | Shearer et al. | 95—1.7 |
| 3,183,805 | 5/1965 | Ritzerfeld | 95—1.7 |

JOHN M. HORAN, *Primary Examiner.*

EVON C. BLUNK, *Examiner.*